UNITED STATES PATENT OFFICE.

HENRY H. BEACH, OF ROME, NEW YORK.

IMPROVEMENT IN PREPARATION OF PEASE.

Specification forming part of Letters Patent No. 215,313, dated May 13, 1879; application filed September 7, 1878.

*To all whom it may concern:*

Be it known that I, HENRY H. BEACH, of Rome, Oneida county, State of New York, have invented a certain new and Improved Preparation of Pease, of which the following is a specification.

My invention has for its object to obtain pease in a condition in which they will be better fitted for the after processes to which they may be subjected with a view to their preparation as food or drink.

To accomplish the object I have in view I cook them by moist heat in the manner indicated in my Letters Patent No. 172,863, dated February 1, 1876—that is to say, I submit them to the action of hot vapor in a suitable vessel or vat until they are properly cooked. Inasmuch as this step is fully described in my Letters Patent above named, it need not be further described here. Instead, however, of then subjecting the pease to a crushing, disintegrating, or grinding operation, which was the operation to which I subjected grain under said Letters Patent, I take the pease while they are still moist and pass them betwen heavy compressing-rollers, where they are flattened, though preserving their individuality, without being broken up or comminuted, but having their shape changed from the globular to that of a flat disk.

Any suitable means for flattening them may be employed. I prefer heavy rollers, both of which are provided, at short intervals in their periphery, with shallow longitudinal grooves. They are then dried when desired for food, or roasted when desired for a table drink.

When cooked and flattened as described, they can be dried or roasted more evenly throughout than in their natural shape, and are not liable to split.

Having described my invention, what I desire to secure by Letters Patent is—

As a new article of manufacture, cooked and flattened pease, as set forth.

In testimony whereof I have hereunto affixed my signature this 7th day of September, 1878.

HENRY H. BEACH.

Witnesses:
 E. A. DICK,
 M. GEORGII.